US012104765B2

(12) United States Patent
Zhu et al.

(10) Patent No.: US 12,104,765 B2
(45) Date of Patent: Oct. 1, 2024

(54) HEAT SPREADER AND ILLUMINATION DEVICE

(71) Applicant: BYD COMPANY LIMITED, Guangdong (CN)

(72) Inventors: Liang Zhu, Shenzhen (CN); Qiang Guo, Shenzhen (CN); Danhua Wen, Shenzhen (CN); Bin Fang, Shenzhen (CN); Siquan Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/614,844

(22) Filed: Mar. 25, 2024

(65) Prior Publication Data

US 2024/0230055 A1 Jul. 11, 2024

Related U.S. Application Data

(63) Continuation of application No. PCT/CN2022/139495, filed on Dec. 16, 2022.

(30) Foreign Application Priority Data

Dec. 29, 2021 (CN) ......................... 202111644188.X

(51) Int. Cl.

*F21S 45/48* (2018.01)
*F21S 45/49* (2018.01)

(Continued)

(52) U.S. Cl.

CPC ............... *F21S 45/48* (2018.01); *F21S 45/49* (2018.01); *F21W 2107/10* (2018.01); *F21Y 2115/10* (2016.08)

(58) Field of Classification Search

CPC ............ F21S 45/48; F21S 45/49; F21S 45/47; F21W 2107/10; F21Y 2115/10;

(Continued)

(56) References Cited

U.S. PATENT DOCUMENTS

2007/0246190 A1 10/2007 Wei

FOREIGN PATENT DOCUMENTS

CN 1194826 C 3/2005
CN 102345995 A 2/2012

(Continued)

OTHER PUBLICATIONS

Fei Guobiao, Light Industry and Science article—Structural Optimization Design of Ribbed Heat Sink Based on Flotherm, vol. 36, No. 5 (2020).

(Continued)

*Primary Examiner* — Elmito Breval

(74) *Attorney, Agent, or Firm* — Calfee, Halter & Griswold LLP

(57) ABSTRACT

A heat spreader and an illumination device including the heat spreader are disclosed. The heat spreader includes a first substrate and multiple first heat dissipation fins, the multiple first heat dissipation fins are arranged side by side on the first substrate at intervals in a first preset direction, and the heat spreader meets constraints of the following Relational expression 1: $N \in \{L/[\bar{\delta}+9], L/[\bar{\delta}+9]+2\}$ and Relational expression 2: $H \in \{[(\delta_1+\delta_2)/2-1.2]/\tan 2\theta, [(\delta_1+\delta_2)/2+1.2]/\tan 2\theta\}$. L represents a length of the first substrate in the first preset direction, represents a weighted average thickness of the multiple first heat dissipation fins, N represents a distribution number of the first heat dissipation fins, $\delta_1$ represents a maximum thickness of the first heat dissipation fin, $\delta_2$ represents a minimum thickness of the first heat dissipation fin, $\theta$ represents a draft angle of the first heat dissipation fin, and H represents a distribution height of the first heat dissipation fin.

20 Claims, 3 Drawing Sheets

(51) Int. Cl.
*F21W 107/10* (2018.01)
*F21Y 115/10* (2016.01)

(58) Field of Classification Search
CPC .......... F21V 29/00; F21V 29/76; F21V 29/74; F21V 29/83; F21V 29/85
See application file for complete search history.

(56) References Cited

FOREIGN PATENT DOCUMENTS

| | | | |
|---|---|---|---|
| CN | 102661562 | A | 9/2012 |
| CN | 105180122 | A | 12/2015 |
| CN | 206055571 | U | 3/2017 |
| CN | 210662706 | U | 6/2020 |
| CN | 211119188 | U | 7/2020 |
| CN | 111551065 | A | 8/2020 |
| CN | 211780849 | U | 10/2020 |
| CN | 112414199 | A | 2/2021 |
| CN | 213362327 | U | 6/2021 |
| WO | 2015/198642 | A1 | 12/2015 |

OTHER PUBLICATIONS

International Search Report from PCT/CN2022/139495 dated Mar. 13, 2023.

HEAT SPREADER AND ILLUMINATION DEVICE

CROSS-REFERENCE TO RELATED APPLICATIONS

The present disclosure is a bypass continuation application of PCT International Application No. PCT/CN2022/139495, filed on Dec. 16, 2022, which claims priority to Chinese Patent Application No. 202111644188.X, filed on Dec. 29, 2021 and entitled "HEAT SPREADER AND ILLUMINATION DEVICE". The entire contents of the above-referenced applications are incorporated herein by reference.

FIELD

The present disclosure relates to the field of heat dissipation device technologies, and more specifically, to a heat spreader and an illumination device.

BACKGROUND

Heat dissipation and junction temperature control are one of most important issues in a design and manufacturing process of a vehicle illumination device. Light attenuation or a service life of the vehicle illumination device is directly related to a junction temperature of the vehicle illumination device, and poor heat dissipation directly results in an increase of the junction temperature and shortening of the service life. In addition, as shapes of vehicle illumination devices become increasingly diversified and complex, heat spreaders with better heat dissipation and smaller sizes can make the vehicle illumination devices have more market advantages in shape designing and also have higher mile ranges, thereby promoting a lightweight process of vehicles. Heat spreaders in existing vehicle illumination devices cannot meet increasing performance requirements of the vehicle illumination devices for heat dissipation.

There are technical development bottlenecks in existing heat spreaders in terms of space utilization and improving heat dissipation efficiency. Space for mounting of the vehicle illumination devices is limited, it is difficult that heat dissipation power of the existing heat spreaders reaches 60 W or more, and heat spreaders with high heat dissipation efficiency have larger sizes, which are difficult to meet use requirements of actual loading. A main problem of the existing heat spreaders is that unreasonable design of a heat spreader structure and fins make it difficult to conduct and disperse heat quickly. Therefore, in this technical field, there is an urgent need for a heat spreader with a compact structure, high space utilization, and more convenient production and use.

SUMMARY

For insufficient space utilization and heat dissipation efficiency in heat spreaders of existing vehicle illumination devices, the present disclosure provides a heat spreader and an illumination device.

A technical solution used by the present disclosure to resolve the foregoing technical problem is as follows:

According to an aspect, the present disclosure provides a heat spreader. The heat spreader includes a first substrate and multiple first heat dissipation fins, the multiple first heat dissipation fins are arranged side by side on the first substrate at intervals in a first preset direction, and the heat spreader meets constraints of the following Relational expression 1 and Relational expression 2:

$$N \in \{L/[\bar{\delta}+9], L/[\bar{\delta}+9]+2\}$$ Relational expression 1 where, L represents a length of the first substrate in the first preset direction, in mm;

$\bar{\delta}$ represents a weighted average thickness of the multiple first heat dissipation fins, in mm; and N represents a distribution number of the first heat dissipation fins, N being a positive integer; and $$H \in \{[(\delta_1+\delta_2)/2-1.2]/\tan 2\theta, [(\delta_1+\delta_2)/2+1.2]/\tan 2\theta\}$$ Relational expression 2 where, $\delta_1$ represents a maximum thickness of the first heat dissipation fin, in mm;

$\delta_2$ represents a minimum thickness of the first heat dissipation fin, in mm;

$\theta$ represents a draft angle of the first heat dissipation fin, in °; and

H represents a distribution height of the first heat dissipation fin, in mm.

In some implementations, the heat spreader further includes a second substrate and multiple second heat dissipation fins, the multiple first heat dissipation fins are arranged side by side on one side surface of the first substrate at intervals in the first preset direction, the second substrate is arranged on an other side surface of the first substrate, the multiple second heat dissipation fins are arranged side by side on one side surface of the second substrate at intervals in a second preset direction, and the heat spreader meets constraints of the following Relational expression 3 and Relational expression 4:

$$N' \in \{L'/[\bar{\delta}'+9], L'/[\bar{\delta}'+9]+2\}$$ Relational expression 3 where, L' represents a length of the second substrate in the second preset direction, in mm;

$\bar{\delta}'$ represents a weighted average thickness of the multiple second heat dissipation fins, in mm; and N' represents a distribution number of the second heat dissipation fins, N being a positive integer; and $$H' \in \{[(\delta_1'+\delta_2')/2-1.2]/\tan 2\theta', [(\delta_1'+\delta_2')/2+1.2]/\tan 2\theta'\}$$ Relational expression 4 where, $\delta_1'$ represents a maximum thickness of the second heat dissipation fin, in mm;

$\delta_2'$ represents a minimum thickness of the second heat dissipation fin, in mm;

$\theta'$ represents a draft angle of the second heat dissipation fin, in °; and H' represents a distribution height of the second heat dissipation fin, in mm.

In some implementations, the first substrate is provided with multiple first heat dissipation holes and multiple second heat dissipation holes, one first heat dissipation hole is arranged between every two adjacent first heat dissipation fins, one second heat dissipation hole is arranged between every two adjacent first heat dissipation fins, and one second heat dissipation hole is arranged between every two adjacent second heat dissipation fins.

In some implementations, a first heat dissipation region, a heat conduction contact region, and a second heat dissipation region are sequentially formed on the other side surface of the first substrate in a direction perpendicular to the first preset direction, an intersection line of the first substrate and the second substrate is parallel to the first preset direction and the second preset direction, the multiple first heat dissipation holes are arranged in the first heat dissipation region, the heat conduction contact region is configured to mount a light source, the second substrate is arranged between the heat conduction contact region and the second heat dissipation region, the multiple second heat dissipation fins are located on a side surface of the second substrate facing away from the heat conduction contact region, the second heat dissipation fins are connected to the second heat dissipation region, and the multiple second heat dissipation holes are arranged in the second heat dissipation region.

In some implementations, a first connecting wing plate and a second connecting wing plate are respectively arranged on two sides of the second substrate in the second preset direction, the first connecting wing plate is provided with a first connecting hole, the second connecting wing plate is provided with a second connecting hole, a first positioning hook and a second positioning hook are respectively arranged on two sides of the first heat dissipation region, the first positioning hook and the second positioning hook are both perpendicular to the first substrate, a first slot is provided on a side of the first positioning hook facing away from the second substrate, and a second slot is provided on a side of the second positioning hook facing away from the second substrate.

In some implementations, the first connecting wing plate, the second connecting wing plate, and the second substrate are located in a same plane.

In some implementations, the first positioning hook and the second positioning hook are configured to position a front end of the heat spreader, and the first connecting wing plate and the second connecting wing plate are configured to position and mount a rear end of the heat spreader.

In some implementations, multiple positioning columns are arranged on the heat conduction contact region.

In some implementations, multiple ejector pins are embedded at intervals in the first heat dissipation fin, the ejector pin is perpendicular to the first substrate, and an outer diameter of the ejector pin is greater than a thickness of the first heat dissipation fin.

In some implementations, the heat spreader is an integral die-cast magnesium alloy piece.

In some implementations, the magnesium alloy piece includes the following components in percentage by mass:

Al: about 1% to about 5%; Zn: about 0 to about 0.2%; Mn: about 0 to about 1%; RE: about 3% to about 6%; Mg: about 87.7% to about 96%; and other elements: less than about 0.1%.

In some implementations, the magnesium alloy piece includes the following components in percentage by mass:

Al: about 1% to about 5%; Zn: about 0 to about 0.2%; Mn: about 0 to about 1%; Ce: about 0 to about 4.0%; Nd: about 0 to about 0.5%; Mg: about 83.2% to about 96%; and other elements: less than about 0.1%.

In some implementations, the magnesium alloy piece includes the following components in percentage by mass:

Al: about 1% to about 5%; Zn: about 0 to about 0.2%; Mn: about 0.8% to about 1%; Ce: about 0.8% to about 2.5%; Nd: about 0 to about 0.5%; Mg: about 83.2% to about 94.4%; and other elements: less than about 0.1%.

According to another aspect, the present disclosure provides an illumination device. The illumination device includes the heat spreader described above.

According to a heat spreader provided in the present disclosure, distribution relationships of heat dissipation fins on a substrate on the heat spreader, such as a number, an arrangement interval, and height design, each have a great impact on a heat dissipation effect of the heat spreader. Therefore, heat dissipation fins of different distribution relationships have a large difference in an overall heat dissipation effect of the heat spreader. The inventor of the present disclosure found through extensive research that, when a length of a first substrate of the heat spreader, a weighted average thickness $\overline{\delta}$ of first heat dissipation fins, and a distribution number N of the first heat dissipation fins meet Relational expression 1: $N \in \{L/[\overline{\delta}+9], L/[\overline{\delta}+9]+2\}$; and a design height H of the first heat dissipation fin, a maximum thickness $\delta_1$ of the first heat dissipation fin, a minimum thickness $\delta_2$ of the first heat dissipation fin, and a draft angle $\theta$ of the first heat dissipation fin meet Relational expression 2: $H \in \{[(\delta_1+\delta_2)/2-1.2]/\tan 2\theta, [(\delta_1+\delta_2)/2+1.2]/\tan 2\theta\}$, the heat spreader can obtain a greatest heat dissipation effect, and heat dissipation power reaches 60 W or more. In addition, a size of the heat spreader is effectively reduced, and a structure thereof is compact, thereby reducing required occupancy space, and meeting actual loading requirements.

Figure 1:
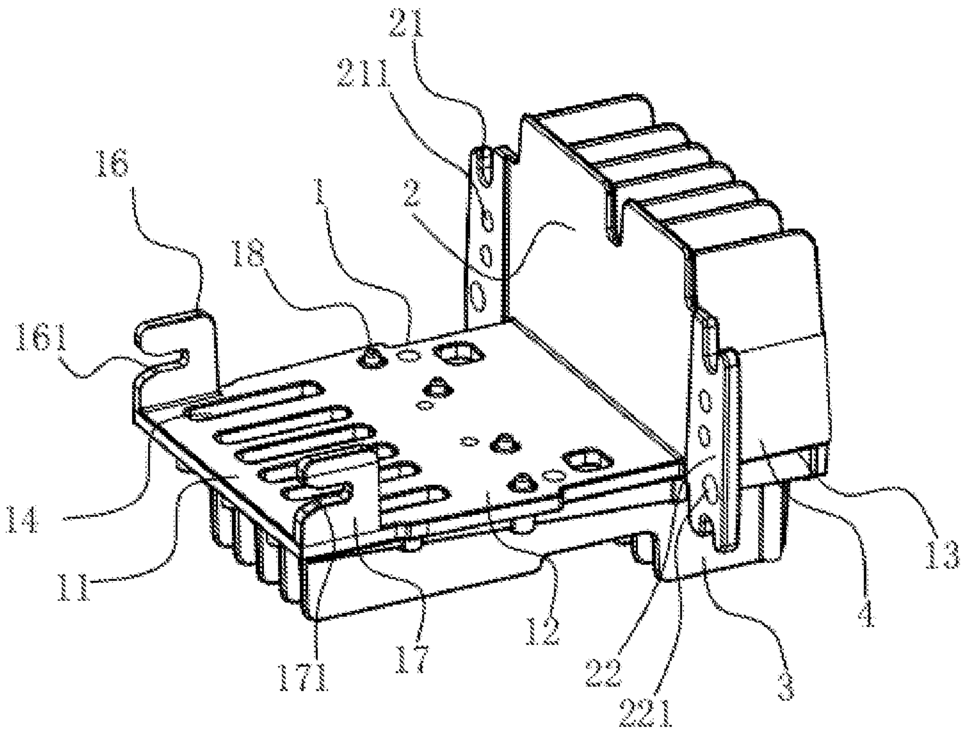
FIG. 1 is a schematic structural diagram of a heat spreader according to the present disclosure.

Reference numerals in the accompanying drawings of the description are as follows:

1: first substrate; 11: first heat dissipation region; 12: heat conduction contact region; 13: second heat dissipation region; 14: first heat dissipation hole; 15: second heat dissipation hole; 16: first positioning hook; 161: first slot; 17: second positioning hook; 171: second slot; 18: positioning column; 2: second substrate; 21: first connecting wing plate; 211: first connecting hole; 22: second connecting wing plate; 221: second connecting hole; 3: first heat dissipation fin; 31: ejector pin; and 4: second heat dissipation fin.

DETAILED DESCRIPTION

To make the technical problem to be resolved by the present disclosure, the technical solution, and beneficial effects more comprehensible, the following further describes the present disclosure in detail with reference to the accompanying drawings and embodiments. It should be understood that, the specific embodiments described therein are merely used for explaining the present disclosure instead of limiting the present disclosure.

Figure 2:
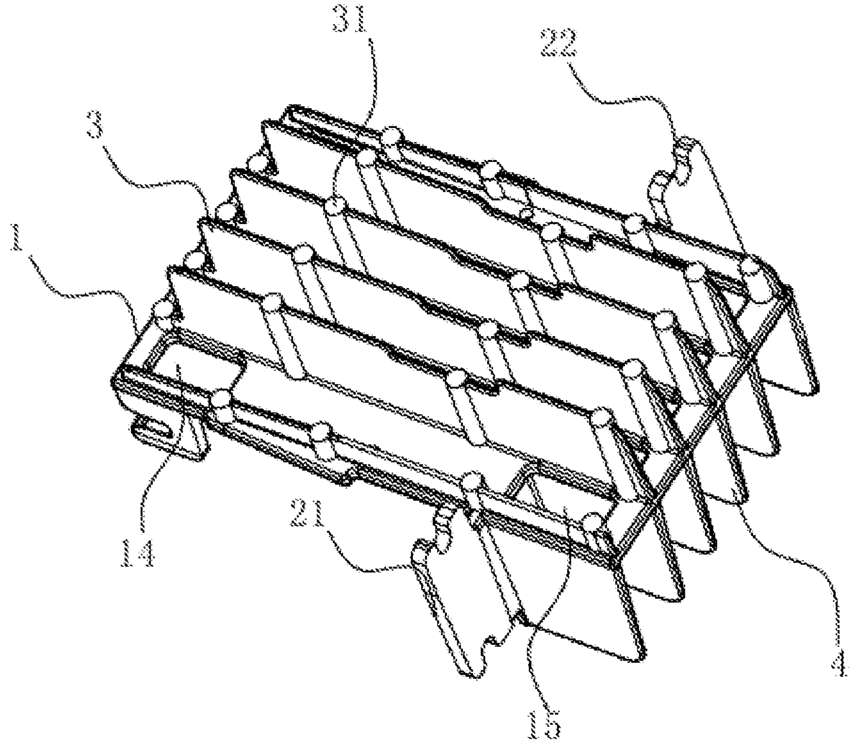
FIG. 2 is a schematic structural diagram of a lower part of a heat spreader according to the present disclosure.
Figure 3:
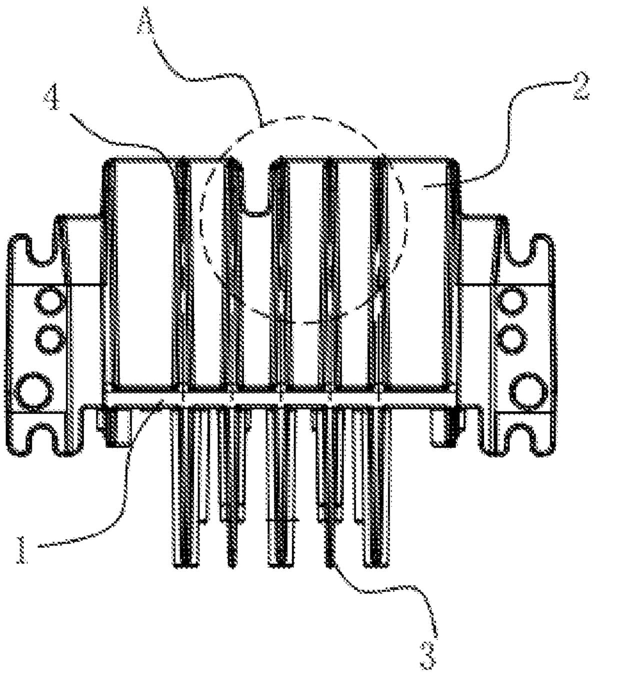
FIG. 3 is a side view of a heat spreader according to the present disclosure.

Referring to FIG. 1 to FIG. 3, some embodiments of the present disclosure provide a heat spreader. The heat spreader includes a first substrate 1 and multiple first heat dissipation fins 3, the multiple first heat dissipation fins 3 are arranged side by side on the first substrate 1 at intervals in a first preset direction, and the heat spreader meets constraints of the following Relational expression 1 and Relational expression 2:

$$N \in \{L/[\bar{\delta}+9],\ L/[\bar{\delta}+9]+2\} \quad \text{Relational expression 1}$$

where, L represents a length of the first substrate in the first preset direction, in mm;

$\bar{\delta}$ represents a weighted average thickness of the multiple first heat dissipation fins, in mm; and N represents a distribution number of the first heat dissipation fins, N being a positive integer; and $$H \in \{[(\delta_1+\delta_2)/2-1.2]/\tan 2\theta,\ [(\delta_1+\delta_2)/2+1.2]/\tan 2\theta\} \quad \text{Relational expression 2}$$

where, $\delta_1$ represents a maximum thickness of the first heat dissipation fin, in mm;

$\delta_2$ represents a minimum thickness of the first heat dissipation fin, in mm;

θ represents a draft angle of the first heat dissipation fin, in °; and

H represents a distribution height of the first heat dissipation fin, in mm.

Distribution relationships of heat dissipation fins on a substrate on a heat spreader, such as a number, an arrangement interval, and height design, each have a great impact on a heat dissipation effect of the heat spreader. Therefore, heat dissipation fins of different distribution relationships have a large difference in an overall heat dissipation effect of the heat spreader. The inventor found through extensive research that, when a length of a first substrate of the heat spreader, a weighted average thickness $\bar{\delta}$ of first heat dissipation fins, and a distribution number N of the first heat dissipation fins meet Relational expression 1: $N\in\{L/[\bar{\delta}+9], L/[\bar{\delta}+9]+2\}$; and a design height H of the first heat dissipation fin, a maximum thickness $\delta_1$ of the first heat dissipation fin, a minimum thickness $\delta_2$ of the first heat dissipation fin, and a draft angle θ of the first heat dissipation fin meet Relational expression 2: $H\in\{[(\delta_1+\delta_2)/2-1.2]/\tan 2\theta, [(\delta_1+\delta_2)/2+1.2]/\tan 2\theta\}$, the heat spreader can obtain a greatest heat dissipation effect, and heat dissipation power reaches 60 W or more. In addition, a size of the heat spreader is effectively reduced, and a structure thereof is compact, thereby reducing required occupancy space, and meeting actual loading requirements.

It should be noted that, in different embodiments, shapes of the multiple first heat dissipation fins 3 may be the same or different. When the multiple first heat dissipation fins 3 have multiple shapes, the multiple first heat dissipation fins 3 are respectively to meet the constraint of Relational expression 2. In some embodiments, shapes of the multiple first heat dissipation fins 3 located on the first substrate 1 are the same, to facilitate processing and manufacturing.

As shown in FIG. 1 and FIG. 2, in some embodiments, the heat spreader further includes a second substrate 2 and multiple second heat dissipation fins 4, the multiple first heat dissipation fins 3 are arranged side by side on one side surface of the first substrate 1 at intervals in the first preset direction, and the second substrate 2 is arranged on an other side surface of the first substrate 1. Specifically, the second substrate 2 is perpendicular to the first substrate 1, the multiple second heat dissipation fins 4 are arranged side by side on one side surface of the second substrate 2 at intervals in a second preset direction, and the heat spreader meets constraints of the following Relational expression 3 and Relational expression 4:

$$N' \in \{L'/[\bar{\delta}'+9],\ L'/[\bar{\delta}'+9]+2\} \quad \text{Relational expression 3}$$

where, L' represents a length of the second substrate in the second preset direction, in mm;

$\bar{\delta}'$ represents a weighted average thickness of the multiple second heat dissipation fins, in mm; and N' represents a distribution number of the second heat dissipation fins, N being a positive integer; and $$H' \in \{[(\delta_1'+\delta_2')/2-1.2]/\tan 2\theta',\ [(\delta_1'+\delta_2')/2+1.2]/\tan 2\theta'\} \quad \text{Relational expression 4}$$

where, $\delta_1'$ represents a maximum thickness of the second heat dissipation fin, in mm;

$\delta_2'$ represents a minimum thickness of the second heat dissipation fin, in mm;

θ' represents a draft angle of the second heat dissipation fin, in °; and

H' represents a distribution height of the second heat dissipation fin, in mm.

The first substrate 1 is configured to mount a light source, and the second substrate 2 is used for auxiliary heat dissipation of the first substrate 1.

It should be noted that, in some embodiments, shapes of the multiple second heat dissipation fins 4 may be the same or different. When the multiple second heat dissipation fins 4 have multiple shapes, the multiple second heat dissipation fins 4 are respectively to meet the constraint of Relational expression 4. In some embodiments, shapes of the multiple second heat dissipation fins 4 located on the second substrate 2 are the same, to facilitate processing and manufacturing.

Figure 4:
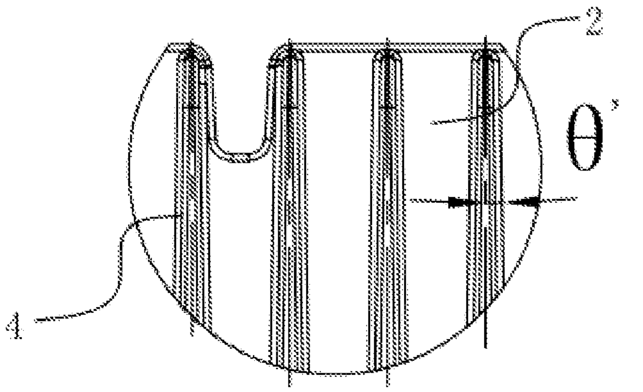
FIG. 4 is a schematic enlarged view of A in FIG. 3.

In the description of the present disclosure, the terms "draft angle θ" and "draft angle θ'" are angles designed to facilitate removal of a workpiece when being demoulded. Specifically, as shown in FIG. 4, the draft angle θ' is an inclination angle between a side surface of the second heat dissipation fin and a central axis.

In some embodiments, the first substrate 1 is provided with multiple first heat dissipation holes 14 and multiple second heat dissipation holes 15, one first heat dissipation hole 14 is arranged between every two adjacent first heat dissipation fins 3, one second heat dissipation hole 15 is arranged between every two adjacent first heat dissipation fins 3, and one second heat dissipation hole 15 is arranged between every two adjacent second heat dissipation fins 4.

The first heat dissipation hole 14 is used for auxiliary heat dissipation of the first heat dissipation fin 3, and the second heat dissipation hole 15 is used for auxiliary heat dissipation of the first heat dissipation fin 3 and the second heat dissipation fin 4. In a heat dissipation process of the heat spreader, heat conduction mainly relies on direct contact between the first substrate 1 and the light source; then heat dissipation is performed through heat conduction among the first substrate 1, the second substrate 2, the first heat dissipation fin 3, and the second heat dissipation fin 4; and then the first substrate 1, the second substrate 2, the first heat dissipation fin 3, and the second heat dissipation fin 4 respectively come into contact with air to perform heat exchange. In a process in which the first heat dissipation fin 3 and the second heat dissipation fin 4 come into contact with air to perform heat exchange, air around them is heated, and the heated air has an ascending trend. However, the first substrate 1 is horizontally placed in an application state, which blocks the ascending hot air. By providing the first heat dissipation hole 14 and the second heat dissipation hole 15 on the first substrate 1, a blocking effect of the first substrate 1 on the hot air can be weakened, and air flow efficiency can be improved, which is conducive to improving heat exchange efficiency.

In some embodiments, a first heat dissipation region 11, a heat conduction contact region 12, and a second heat dissipation region 13 are sequentially formed on the other side surface of the first substrate 1 in a direction perpendicular to the first preset direction, an intersection line of the first substrate 1 and the second substrate 2 is parallel to the first preset direction and the second preset direction, the multiple first heat dissipation holes 14 are arranged in the first heat dissipation region 11, the heat conduction contact region 12 is configured to mount the light source, the second substrate 2 is arranged between the heat conduction contact region 12 and the second heat dissipation region 13, the multiple second heat dissipation fins 4 are located on a side surface of the second substrate 2 facing away from the heat conduction contact region 12, the second heat dissipation fins 4 are connected to the second heat dissipation region 13, and the multiple second heat dissipation holes 15 are arranged in the second heat dissipation region 13.

In the description of the present disclosure, "the direction perpendicular to the first preset direction" should be broadly understood. In some embodiments, a direction forming an angle of 80° to 100° with the first preset direction is essentially the same as perpendicular, and can also be understood as "the direction perpendicular to the first preset direction".

The heat conduction contact region 12 is configured to mount the light source, and is also for heat conduction among the first heat dissipation region 11, the second heat dissipation region 13, and the second substrate 2. Therefore, the heat conduction contact region 12 necessarily has an area that is fully in contact with the light source, and simultaneously has a larger connection cross section with the first heat dissipation region 11, the second heat dissipation region 13, and the second substrate 2. When the heat spreader is in the application state, the first heat dissipation fin 3 is vertically arranged, and hot air with heat exchange being performed through the first heat dissipation fin 3 ascends along a side wall of the first heat dissipation fin 3. By providing the multiple first heat dissipation holes 14 and the multiple second heat dissipation holes 15 on the first heat dissipation region 11 and the second heat dissipation region 13, flowing of hot air between under the first substrate 1 and above the first substrate 1 can be promoted, thereby promoting air convection above the first substrate 1, and improving heat dissipation efficiency of space in which the light source is located. In addition, the second heat dissipation hole 15 is also beneficial to air convection below a side wall of the second heat dissipation fin 4 after hot air ascends, thereby improving heat dissipation efficiency of the second heat dissipation fin 4.

In some embodiments, a first connecting wing plate 21 and a second connecting wing plate 22 are respectively arranged on two sides of the second substrate 2 in the second preset direction, the first connecting wing plate 21 is provided with a first connecting hole 211, and the second connecting wing plate 22 is provided with a second connecting hole 221. In some embodiments, the first connecting wing plate 21, the second connecting wing plate 22, and the second substrate 2 are located in a same plane. A first positioning hook 16 and a second positioning hook 17 are respectively arranged on two sides of the first heat dissipation region 11, the first positioning hook 16 and the second positioning hook 17 are located on two sides of an end portion of the first substrate 1, the first positioning hook 16 and the second positioning hook 17 are both perpendicular to the first substrate 1, a first slot 161 is provided on a side of the first positioning hook 16 facing away from the second substrate 2, and a second slot 171 is provided on a side of the second positioning hook 17 facing away from the second substrate 2.

The first positioning hook 16 and the second positioning hook 17 are configured to position a front end of the heat spreader, and the first connecting wing plate 21 and the second connecting wing plate 22 are configured to position and mount a rear end of the heat spreader. During mounting, the first slot 161 and the second slot 171 are respectively embedded in positioning structures of an illumination device, and screws are also arranged to penetrate the first connecting hole 211 and the second connecting hole 221 for fixing.

As shown in FIG. 1, in some embodiments, multiple positioning columns 18 are arranged on the heat conduction contact region 12, to facilitate mounting and positioning of the light source.

In some embodiments, multiple ejector pins 31 are embedded at intervals in the first heat dissipation fin 3, the ejector pin 31 is perpendicular to the first substrate 1, and an outer diameter of the ejector pin 31 is greater than a thickness of the first heat dissipation fin 3.

The ejector pin 31 can disturb flowing of hot air between the first heat dissipation fins 3. In addition, the ejector pin 31 has higher strength than the first heat dissipation fin 3, and can be used as a support point for demoulding during die-casting.

In some embodiments, the heat spreader is an integral die-cast magnesium alloy piece.

By integrally die-casting the heat spreader, an assembly process can be reduced, and the first substrate 1, the second substrate 2, the first heat dissipation fins 3, and the second heat dissipation fins 4 are also integrally formed, thereby improving heat conduction efficiency among various parts, without requiring additional heat conductive silicone to ensure tight integration and heat conduction at joints. By integrally forming the first connecting wing plate 21, the second connecting wing plate 22, the first positioning hook 16, the second positioning hook 17, and the first substrate 1, mounting precision between the light source and a lamp lens is improved while improving heat conduction.

As a material of the heat spreader, a magnesium alloy has high heat conductivity, and also has mechanical properties. In this way, the magnesium alloy can be effectively used in conditions and environments that require high heat conductivity and lightweight design.

In some embodiments, the magnesium alloy piece includes the following components in percentage by mass:

Al: about 1% to about 5%; Zn: about 0 to about 0.2%; Mn: about 0 to about 1%; RE: about 3% to about 6%; Mg: about 87.7% to about 96%; and other elements: less than about 0.1%.

In the foregoing components, Al can improve strength and corrosion resistance of the magnesium alloy; Mn can improve elongation and toughness of the magnesium alloy; and Zn can play a solid solution strengthening role and form a strengthening phase, to improve mechanical strength of the magnesium alloy, where RE refers to rare earth elements and is used to refine grains.

In some embodiments, the magnesium alloy piece includes the following components in percentage by mass:

Al: about 1% to about 5%; Zn: about 0 to about 0.2%; Mn: about 0.8% to about 1%; RE: about 3% to about 6%; Mg: about 87.7% to about 95.2%; and other elements: less than about 0.1%.

Through element selection, the magnesium alloy has both very high heat conductivity and excellent mechanical properties. In this way, the magnesium alloy can be used in scenarios that require high heat conductivity and have structural mechanics requirements, and can also achieve lightweight and low-cost design requirements, especially suitable for manufacturing the heat spreader of the vehicle illumination device. Lightweight design of the heat spreader is a key technology to improve the mile range and meet the mile range requirement.

In some embodiments, a surface of the heat spreader is sandblasted and anodized to further increase a contact area with air, and enhance a capability to radiate heat to surrounding air.

Figure 5:
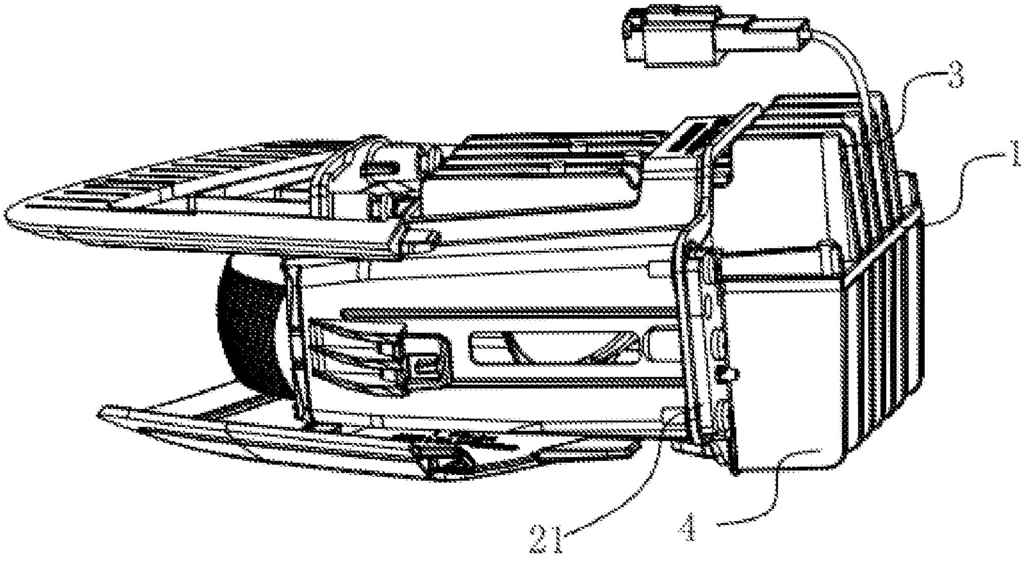
FIG. 5 is a schematic structural diagram of an illumination device according to the present disclosure.

As shown in FIG. 5, another aspect of the present disclosure provides an illumination device. The illumination device includes the heat spreader described above.

By using the heat spreader, heat dissipation efficiency of the illumination device can be effectively improved, and occupancy space required for mounting of the illumination device on a vehicle is also reduced, thereby achieving lightweight and low-cost design requirements.

The present disclosure is further described below through embodiments.

Example 1

This embodiment is used to describe the heat spreader disclosed in the present disclosure. The heat spreader includes a first substrate, a second substrate, multiple first heat dissipation fins, and multiple second heat dissipation fins. The multiple first heat dissipation fins are arranged side by side on one side surface of the first substrate at intervals in the first preset direction, the second substrate is perpendicularly arranged on an other side surface of the first substrate, and the multiple second heat dissipation fins are arranged side by side on one side surface of the second substrate at intervals in a second preset direction.

The first substrate is provided with multiple first heat dissipation holes and multiple second heat dissipation holes, one first heat dissipation hole is arranged between every two adjacent first heat dissipation fins, one second heat dissipation hole is arranged between every two adjacent first heat dissipation fins, and one second heat dissipation hole is arranged between every two adjacent second heat dissipation fins.

A first heat dissipation region, a heat conduction contact region, and a second heat dissipation region are sequentially formed on the other side surface of the first substrate in a direction perpendicular to the first preset direction, an intersection line of the first substrate and the second substrate is parallel to the first preset direction and the second preset direction, the multiple first heat dissipation holes are arranged in the first heat dissipation region, the heat conduction contact region is configured to mount a light source, the second substrate is arranged between the heat conduction contact region and the second heat dissipation region, the multiple second heat dissipation fins are located on a side surface of the second substrate facing away from the heat conduction contact region, the second heat dissipation fins are connected to the second heat dissipation region, and the multiple second heat dissipation holes are arranged in the second heat dissipation region.

The heat spreader meets the following conditions:

| | |
|---|---|
| Length L of the first substrate in the first preset direction, in mm | 65 |
| Weighted average thickness $\bar{\delta}$ of the multiple first heat dissipation fins, in mm | 1.9 |
| Distribution number N of the first heat dissipation fins | 7 |
| Thickness maximum value $\delta_1$ of the first heat dissipation fin, in mm | 2.6 |
| Thickness minimum value $\delta_2$ of the first heat dissipation fin, in mm | 1.4 |
| Draft angle θ of the first heat dissipation fin, in ° | 1 |
| Distribution height H of the first heat dissipation fin, in mm | 35 |
| Length L' of the second substrate in the second preset direction, in mm | 65 |
| Weighted average thickness $\bar{\delta}'$ of the multiple second heat dissipation fins, in mm | 1.9 |
| Distribution number N' of the second heat dissipation fins | 7 |
| Thickness maximum value $\delta_1'$ of the second heat dissipation fin, in mm | 2.6 |
| Thickness minimum value $\delta_2'$ of the second heat dissipation fin, in mm | 1.4 |
| Draft angle θ' of the second heat dissipation fin, in ° | 1 |
| Distribution height H' of the second heat dissipation fin, in mm | 35 |

Example 2

This embodiment is used to describe the heat spreader disclosed in the present disclosure. The heat spreader includes most of structures in Example 1, and differences are as follows:

| | |
|---|---|
| Length L of the first substrate in the first preset direction, in mm | 75 |
| Weighted average thickness $\bar{\delta}$ of the multiple first heat dissipation fins, in mm | 2.1 |
| Distribution number N of the first heat dissipation fins | 8 |
| Thickness maximum value $\delta_1$ of the first heat dissipation fin, in mm | 2.8 |
| Thickness minimum value $\delta_2$ of the first heat dissipation fin, in mm | 1.4 |
| Draft angle θ of the first heat dissipation fin, in ° | 1.2 |
| Distribution height H of the first heat dissipation fin, in mm | 33 |
| Length L' of the second substrate in the second preset direction, in mm | 75 |
| Weighted average thickness $\bar{\delta}'$ of the multiple second heat dissipation fins, in mm | 2.1 |
| Distribution number N' of the second heat dissipation fins | 8 |
| Thickness maximum value $\delta_1'$ of the second heat dissipation fin, in mm | 2.8 |
| Thickness minimum value $\delta_2'$ of the second heat dissipation fin, in mm | 1.4 |

-continued

| | |
|---|---|
| Draft angle θ' of the second heat dissipation fin, in ° | 1.2 |
| Distribution height H' of the second heat dissipation fin, in mm | 33 |

Example 3

This embodiment is used to describe the heat spreader disclosed in the present disclosure. The heat spreader includes most of structures in Example 1, and differences are as follows:

| | |
|---|---|
| Length L of the first substrate in the first preset direction, in mm | 85 |
| Weighted average thickness $\bar{\delta}$ of the multiple first heat dissipation fins, in mm | 2.4 |
| Distribution number N of the first heat dissipation fins | 9 |
| Thickness maximum value $\delta_1$ of the first heat dissipation fin, in mm | 3.2 |
| Thickness minimum value $\delta_2$ of the first heat dissipation fin, in mm | 1.6 |
| Draft angle θ of the first heat dissipation fin, in ° | 1.5 |
| Distribution height H of the first heat dissipation fin, in mm | 30 |
| Length L' of the second substrate in the second preset direction, in mm | 85 |
| Weighted average thickness $\bar{\delta}'$ of the multiple second heat dissipation fins, in mm | 2.4 |
| Distribution number N' of the second heat dissipation fins | 9 |
| Thickness maximum value $\delta_1'$ of the second heat dissipation fin, in mm | 3.2 |
| Thickness minimum value $\delta_2'$ of the second heat dissipation fin, in mm | 1.6 |
| Draft angle θ' of the second heat dissipation fin, in ° | 1.5 |
| Distribution height H' of the second heat dissipation fin, in mm | 30 |

Example 4

This embodiment is used to describe the heat spreader disclosed in the present disclosure. The heat spreader includes most of structures in Example 1, and differences are as follows:

there is no first heat dissipation hole and no second heat dissipation hole provided on the first substrate.

Comparative Example 1

This comparative example is used to comparatively describe the heat spreader disclosed in the present disclosure. The heat spreader includes most of structures in Example 1, and differences are as follows:

| | |
|---|---|
| Length L of the first substrate in the first preset direction, in mm | 65 |
| Weighted average thickness $\bar{\delta}$ of the multiple first heat dissipation fins, in mm | 1.9 |
| Distribution number N of the first heat dissipation fins | 5 |
| Thickness maximum value $\delta_1$ of the first heat dissipation fin, in mm | 2.6 |

-continued

| | |
|---|---|
| Thickness minimum value $\delta_2$ of the first heat dissipation fin, in mm | 1.4 |
| Draft angle θ of the first heat dissipation fin, in ° | 1 |
| Distribution height H of the first heat dissipation fin, in mm | 35 |
| Length L' of the second substrate in the second preset direction, in mm | 65 |
| Weighted average thickness $\bar{\delta}'$ of the multiple second heat dissipation fins, in mm | 1.9 |
| Distribution number N' of the second heat dissipation fins | 5 |
| Thickness maximum value $\delta_1'$ of the second heat dissipation fin, in mm | 2.6 |
| Thickness minimum value $\delta_2'$ of the second heat dissipation fin, in mm | 1.4 |
| Draft angle θ' of the second heat dissipation fin, in ° | 1 |
| Distribution height H' of the second heat dissipation fin, in mm | 35 |

Comparative Example 2

This comparative example is used to comparatively describe the heat spreader disclosed in the present disclosure. The heat spreader includes most of structures in Example 1, and differences are as follows:

| | |
|---|---|
| Length L of the first substrate in the first preset direction, in mm | 85 |
| Weighted average thickness $\bar{\delta}$ of the multiple first heat dissipation fins, in mm | 2.6 |
| Distribution number N of the first heat dissipation fins | 10 |
| Thickness maximum value $\delta_1$ of the first heat dissipation fin, in mm | 3.2 |
| Thickness minimum value $\delta_2$ of the first heat dissipation fin, in mm | 2.0 |
| Draft angle θ of the first heat dissipation fin, in ° | 1.5 |
| Distribution height H of the first heat dissipation fin, in mm | 22 |
| Length L' of the second substrate in the second preset direction, in mm | 85 |
| Weighted average thickness $\bar{\delta}'$ of the multiple second heat dissipation fins, in mm | 2.6 |
| Distribution number N' of the second heat dissipation fins | 10 |
| Thickness maximum value $\delta_1'$ of the second heat dissipation fin, in mm | 3.2 |
| Thickness minimum value $\delta_2'$ of the second heat dissipation fin, in mm | 2.0 |
| Draft angle θ' of the second heat dissipation fin, in ° | 1.5 |
| Distribution height H' of the second heat dissipation fin, in mm | 22 |

Performance Testing

Performance testing is performed on the heat spreaders provided in the foregoing embodiments and comparative examples:

After the heat spreaders obtained in the embodiments and comparative examples are weighed, LED chips of same power are respectively mounted on the heat spreaders obtained in the embodiments and comparative examples. After the LED chips are started to run for 2 H, core temperatures of the LED chips are detected. Obtained testing results are listed in Table 1.

TABLE 1

| Sample | Core temperature/°C of the LED chip | Weight/g |
|---|---|---|
| Example 1 | 121.8 | 117 |
| Example 2 | 122.0 | 126 |
| Example 3 | 121.9 | 135 |
| Example 4 | 122.6 | 119 |
| Comparative example 1 | 123.4 | 101 |
| Comparative example 2 | 123.1 | 143 |

It can be seen from the testing results in Table 1 that, a heat spreader that meets constraints of Relational expression 1 and Relational expression 2 provided in the present disclosure has a significant improvement in heat dissipation efficiency, can effectively reduce a core temperature of an LED chip, and also has a lower weight, which is conducive to lightweighting a vehicle illumination device. Specifically, for example, the LED chip in Example 1 has a lowest core temperature, and has a lightest weight. An only difference between Example 1 and Comparative example 1 is that a number of first heat dissipation fins and a number of second heat dissipation fins in Example 1 are larger. In other words, compared with Comparative example 1, in Example 1, more heat dissipation fins are mounted in a same space, and in this case, the core temperature of the LED chip in Example 1 is also lower. Therefore, on the premise of meeting the constraints of Relational expression 1 and Relational expression 2 provided in the present disclosure, by mounting more heat dissipation fins in the same space in Example 1, space utilization of the heat spreader is improved, and heat dissipation efficiency of the heat spreader is also improved. For another example, compared with Comparative example 2, in Example 4, there is no first heat dissipation hole and second heat dissipation hole on the first substrate. However, because the length of the first substrate in the first preset direction is shorter and the weighted average thickness of the multiple first heat dissipation fins is thinner, and the distribution number of the first heat dissipation fins is smaller, a size is smaller, and a weight is lighter. It can be seen from the testing results in Table 1 that, compared to Comparative example 2, the center temperature of the LED chip in Example 4 is also lower. Therefore, on the premise of meeting the constraints of Relational expression 1 and Relational expression 2 provided in the present disclosure, the heat spreader in Example 4 has a smaller size, a lighter weight, and higher heat dissipation efficiency. In conclusion, the heat spreader disclosed in the present disclosure resolves insufficient space utilization and heat dissipation efficiency.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A heat spreader, comprising a first substrate and a plurality of first heat dissipation fins, the plurality of first heat dissipation fins being arranged side by side on the first substrate at intervals in a first preset direction, and the heat spreader meeting constraints of the following Relational expression 1 and Relational expression 2:

$$N \in \{L/[\bar{\delta}+9],\ L/[\bar{\delta}+9]+2\} \quad \text{Relational expression 1}$$

wherein, L represents a length of the first substrate in the first preset direction, in mm;

$\bar{\delta}$ represents a weighted average thickness of the plurality of first heat dissipation fins, in mm; and N represents a distribution number of the first heat dissipation fins, N being a positive integer; and $$H \in \{[(\delta_1+\delta_2)/2-1.2]/\tan 2\theta,\ [(\delta_1+\delta_2)/2+1.2]/\tan 2\theta\} \quad \text{Relational expression 2}$$

wherein, $\delta_1$ represents a maximum thickness of the first heat dissipation fin, in mm;

$\delta_2$ represents a minimum thickness of the first heat dissipation fin, in mm;

$\theta$ represents a draft angle of the first heat dissipation fin, in °; and

H represents a distribution height of the first heat dissipation fin, in mm.

2. The heat spreader according to claim 1, further comprising a second substrate and a plurality of second heat dissipation fins, the plurality of first heat dissipation fins being arranged side by side on one side surface of the first substrate at intervals in the first preset direction, the second substrate being arranged on an other side surface of the first substrate, the plurality of second heat dissipation fins being arranged side by side on one side surface of the second substrate at intervals in a second preset direction, and the heat spreader meeting constraints of the following Relational expression 3 and Relational expression 4:

$$N' \in \{L'/[\bar{\delta}'+9],\ L'/[\bar{\delta}'+9]+2\} \quad \text{Relational expression 3}$$

wherein, L' represents a length of the second substrate in the second preset direction, in mm;

$\bar{\delta}'$ represents a weighted average thickness of the plurality of second heat dissipation fins, in mm; and N' represents a distribution number of the second heat dissipation fins, N being a positive integer; and $$H' \in \{[(\delta_1'+\delta_2')/2-1.2]/\tan 2\theta',\ [(\delta_1'+\delta_2')/2+1.2]/\tan 2\theta'\} \quad \text{Relational expression 4}$$

wherein, $\delta_1'$ represents a maximum thickness of the second heat dissipation fin, in mm;

$\delta_2'$ represents a minimum thickness of the second heat dissipation fin, in mm;

$\theta'$ represents a draft angle of the second heat dissipation fin, in °; and H' represents a distribution height of the second heat dissipation fin, in mm.

3. The heat spreader according to claim 2, wherein the first substrate is provided with a plurality of first heat dissipation holes and a plurality of second heat dissipation holes, one first heat dissipation hole is arranged between every two adjacent first heat dissipation fins, one second heat dissipation hole is arranged between every two adjacent first heat dissipation fins, and one second heat dissipation hole is arranged between every two adjacent second heat dissipation fins.

4. The heat spreader according to claim 3, wherein a first heat dissipation region, a heat conduction contact region, and a second heat dissipation region are sequentially formed on the other side surface of the first substrate in a direction perpendicular to the first preset direction, an intersection line of the first substrate and the second substrate is parallel to the first preset direction and the second preset direction, the plurality of first heat dissipation holes are arranged in the first heat dissipation region, the heat conduction contact region is configured to mount a light source, the second substrate is arranged between the heat conduction contact region and the second heat dissipation region, the plurality of second heat dissipation fins are located on a side surface of the second substrate facing away from the heat conduction contact region, the second heat dissipation fins are connected to the second heat dissipation region, and the plurality of second heat dissipation holes are arranged in the second heat dissipation region.

5. The heat spreader according to claim 2, wherein a first heat dissipation region, a heat conduction contact region, and a second heat dissipation region are sequentially formed on the other side surface of the first substrate in a direction perpendicular to the first preset direction, an intersection line of the first substrate and the second substrate is parallel to the first preset direction and the second preset direction, the plurality of first heat dissipation holes are arranged in the first heat dissipation region, the heat conduction contact region is configured to mount a light source, the second substrate is arranged between the heat conduction contact region and the second heat dissipation region, the plurality of second heat dissipation fins are located on a side surface of the second substrate facing away from the heat conduction contact region, the second heat dissipation fins are connected to the second heat dissipation region, and the plurality of second heat dissipation holes are arranged in the second heat dissipation region.

6. The heat spreader according to claim 5, wherein a plurality of positioning columns are arranged on the heat conduction contact region.

7. The heat spreader according to claim 6, wherein a plurality of ejector pins are embedded at intervals in the first heat dissipation fin, the ejector pin is perpendicular to the first substrate, and an outer diameter of the ejector pin is greater than a thickness of the first heat dissipation fin.

8. The heat spreader according to claim 5, wherein a first connecting wing plate and a second connecting wing plate are respectively arranged on two sides of the second substrate in the second preset direction, the first connecting wing plate is provided with a first connecting hole, the second connecting wing plate is provided with a second connecting hole, a first positioning hook and a second positioning hook are respectively arranged on two sides of the first heat dissipation region, the first positioning hook and the second positioning hook are both perpendicular to the first substrate, a first slot is provided on a side of the first positioning hook facing away from the second substrate, and a second slot is provided on a side of the second positioning hook facing away from the second substrate.

9. The heat spreader according to claim 2, wherein a first connecting wing plate and a second connecting wing plate are respectively arranged on two sides of the second substrate in the second preset direction, the first connecting wing plate is provided with a first connecting hole, the second connecting wing plate is provided with a second connecting hole, a first positioning hook and a second positioning hook are respectively arranged on two sides of the first heat dissipation region, the first positioning hook and the second positioning hook are both perpendicular to the first substrate, a first slot is provided on a side of the first positioning hook facing away from the second substrate, and a second slot is provided on a side of the second positioning hook facing away from the second substrate.

10. The heat spreader according to claim 9, wherein the first connecting wing plate, the second connecting wing plate, and the second substrate are located in a same plane.

11. The heat spreader according to claim 10, wherein the first positioning hook and the second positioning hook are configured to position a front end of the heat spreader, and the first connecting wing plate and the second connecting wing plate are configured to position and mount a rear end of the heat spreader.

12. The heat spreader according to claim 9, wherein the first positioning hook and the second positioning hook are configured to position a front end of the heat spreader, and the first connecting wing plate and the second connecting wing plate are configured to position and mount a rear end of the heat spreader.

13. The heat spreader according to claim 12, wherein a plurality of positioning columns are arranged on the heat conduction contact region.

14. The heat spreader according to claim 1, wherein a plurality of ejector pins are embedded at intervals in the first heat dissipation fin, the ejector pin is perpendicular to the first substrate, and an outer diameter of the ejector pin is greater than a thickness of the first heat dissipation fin.

15. The heat spreader according to claim 14, wherein the heat spreader is an integral die-cast magnesium alloy piece.

16. The heat spreader according to claim 1, wherein the heat spreader is an integral die-cast magnesium alloy piece.

17. The heat spreader according to claim 16, wherein the magnesium alloy piece comprises the following components in percentage by mass:

Al: about 1% to about 5%; Zn: about 0 to about 0.2%; Mn: about 0 to about 1%; RE: about 3% to about 6%; Mg: about 87.7% to about 96%; and other elements: less than about 0.1%.

18. The heat spreader according to claim 16, wherein the magnesium alloy piece comprises the following components in percentage by mass:

Al: about 1% to about 5%; Zn: about 0 to about 0.2%; Mn: about 0 to about 1%; Ce: about 0 to about 4.0%; Nd: about 0 to about 0.5%; Mg: about 83.2% to about 96%; and other elements: less than about 0.1%.

19. The heat spreader according to claim 16, wherein the magnesium alloy piece comprises the following components in percentage by mass:

Al: about 1% to about 5%; Zn: about 0 to about 0.2%; Mn: about 0.8% to about 1%; Ce: about 0.8% to about 2.5%; Nd: about 0 to about 0.5%; Mg: about 83.2% to about 94.4%; and other elements: less than about 0.1%.

20. An illumination device, comprising the heat spreader according to claim 1.

* * * * *